United States Patent
Tsuda

(10) Patent No.: US 9,087,515 B2
(45) Date of Patent: Jul. 21, 2015

(54) DETERMINING NAVIGATION DESTINATION TARGET IN A SITUATION OF REPEATED SPEECH RECOGNITION ERRORS

(75) Inventor: Takahiro Tsuda, Inazawa (JP)

(73) Assignee: DENSO CORPORATION, Kariya (JP)

( * ) Notice: Subject to any disclaimer, the term of this patent is extended or adjusted under 35 U.S.C. 154(b) by 935 days.

(21) Appl. No.: 13/272,568

(22) Filed: Oct. 13, 2011

(65) Prior Publication Data
US 2012/0101821 A1    Apr. 26, 2012

(30) Foreign Application Priority Data
Oct. 25, 2010  (JP) .................. 2010-238503

(51) Int. Cl.
G10L 15/22      (2006.01)
G10L 15/06      (2013.01)

(52) U.S. Cl.
CPC ............... *G10L 15/22* (2013.01); *G10L 15/06* (2013.01)

(58) Field of Classification Search
CPC ....................................................... G10L 15/22
USPC .................................................. 704/270, 275
See application file for complete search history.

(56) References Cited

U.S. PATENT DOCUMENTS

| | | | |
|---|---|---|---|
| 5,712,957 A * | 1/1998 | Waibel et al. ................ | 704/240 |
| 6,067,521 A | 5/2000 | Ishii et al. | |
| 6,195,635 B1 * | 2/2001 | Wright .......................... | 704/231 |
| 6,513,005 B1 * | 1/2003 | Qin et al. ...................... | 704/254 |
| 7,386,454 B2 * | 6/2008 | Gopinath et al. ............. | 704/270 |
| 7,516,077 B2 * | 4/2009 | Yokoi et al. .................. | 704/275 |
| 7,756,710 B2 * | 7/2010 | Franco et al. ................ | 704/255 |
| 2002/0138196 A1 * | 9/2002 | Polidi et al. .................. | 701/208 |
| 2003/0023432 A1 * | 1/2003 | Kyomitsu ..................... | 704/231 |
| 2003/0216912 A1 * | 11/2003 | Chino .......................... | 704/231 |
| 2003/0216918 A1 * | 11/2003 | Toyama et al. .............. | 704/254 |
| 2004/0015365 A1 * | 1/2004 | Ohmori et al. ............... | 704/276 |
| 2005/0159949 A1 * | 7/2005 | Yu et al. ....................... | 704/235 |
| 2006/0293889 A1 * | 12/2006 | Kiss et al. .................... | 704/235 |
| 2008/0126091 A1 * | 5/2008 | Clark et al. .................. | 704/246 |
| 2009/0313016 A1 * | 12/2009 | Cevik et al. ................. | 704/241 |
| 2010/0076765 A1 * | 3/2010 | Zweig et al. ................. | 704/255 |
| 2010/0217598 A1 * | 8/2010 | Adachi ......................... | 704/254 |

FOREIGN PATENT DOCUMENTS

| | | | |
|---|---|---|---|
| JP | B2-02-35988 | 8/1990 | |
| JP | A-2002-287792 | 10/2002 | |
| JP | A-2002-340581 | 11/2002 | |
| JP | A-2003-131695 | 5/2003 | |
| JP | A-2006-178898 | 7/2006 | |
| JP | A-2010-210756 | * 9/2010 | .............. G10L 15/00 |

* cited by examiner

*Primary Examiner* — Jialong He
(74) *Attorney, Agent, or Firm* — Posz Law Group, PLC

(57) ABSTRACT

A speech recognition apparatus is disclosed. The apparatus converts a speech signal into a digitalized speech data, and performs speech recognition based on the speech data. The apparatus makes a comparison between the speech data inputted the last time and the speech data inputted the time before the last time in response to a user's indication that the speech recognition results in erroneous recognition multiple times in a row. When the speech data inputted the last time is determined to substantially match the speech data inputted the time before the last time, the apparatus outputs a guidance prompting the user to utter an input target by calling it by another name.

12 Claims, 11 Drawing Sheets

DETERMINING NAVIGATION DESTINATION TARGET IN A SITUATION OF REPEATED SPEECH RECOGNITION ERRORS

CROSS REFERENCE TO RELATED APPLICATION

The present application is based on and claims priority to Japanese Patent Application No. 2010-238503 filed on Oct. 25, 2010, disclosure of which is incorporated herein by reference.

TECHNICAL FIELD

The present disclosure relates to a speech recognition apparatus adapted for inputting a facility name etc. via speech.

BACKGROUND

For improvement of safety and operability, some car navigation apparatuses employ a human-machine interface (HMI) that allows a user to input a facility name or the like by uttering word or words (speech). To implement the HMI, the car navigation apparatus is equipped with a speech recognition apparatus for recognizing the user-uttered speech (cf. JP-H9-114487A).

When the user inputs a name of facility etc. by his or her speech, the user's speech is recognized by the speech recognition apparatus. In this case, erroneous recognition can occur for the following reasons. When the user utters a name of facility etc. that is not registered in a database for speech recognition, the speech recognition of the name of facility etc. is unsuccessfully performed, and the erroneous recognition occurs.

In response to the erroneous recognition, the user may consider that his or her style of speaking is incorrect, or that the speech recognition apparatus has low recognition accuracy. Then, the user may try to utter the name of an input-target facility with different intonation with hope for successful speech recognition. In this case, since the speech recognition apparatus continues to perform the erroneous recognition, the user may give up using the speech recognition apparatus or may get a bad impression of the speech recognition apparatus.

In the case of the above kind of erroneous recognition, if the user speaks an input-target facility by calling it by another name (e.g., official name), the speech recognition may be successfully performed. This is because another name of the recognition-desired facility is registered in the database in many cases. However, in the case of the erroneous recognition, the user may get frustrated with the failure of the speech recognition and the user cannot take appropriate measures such as calling the facility by another name. This is experimentally shown.

SUMMARY

In view of the foregoing, it is an objective of the present disclosure to provide a speech recognition apparatus that can prevent erroneous recognition from continuing when a user repeatedly utters a facility name that is not registered in a database for speech recognition.

According to a first aspect of the present disclosure, a speech recognition apparatus includes a speech recognition section, a comparison section and a guidance output section. The speech recognition section performs digital conversion to convert a speech signal into a digitalized speech data, and performs speech recognition based on the speech data. The speech signal is inputted via a microphone from a user. The comparison section makes a comparison between the speech data inputted the last time and the speech data inputted the time before the last time in response to a user's indication that the speech recognition for recognizing a name of a user-input-target facility by the speech recognition section results in erroneous recognition multiple times in a row. The user-input-target facility is a specific facility that the user would like to input. When the comparison section determines that the speech data inputted the last time substantially matches the speech data inputted the time before the last time, the guidance output section performs a predetermined operation. For example, the guidance output section may output a guidance prompting the user to utter the user-input-target facility by calling the user-input-target facility by another name. Alternatively, the guidance output section may make a list of names of facilities existing in an area in the vicinity of a present position and displays the list with a display device. Alternatively, the guidance output section may connect to the external server via Internet, may make a search by using a feature of the speech data as a search key to retrieve content, and may display the retrieve content with the display device 230.

According to a second aspect of the present disclosure, a speech recognition apparatus for a vehicle includes a speech recognition section, a comparison section and an external-byname providing section. The speech recognition section performs digital conversion to convert a speech signal, which is inputted via a microphone from a user, into a speech data, and performs speech recognition based on the speech data. The comparison section makes a comparison between the speech data inputted the last time and the speech data inputted the time before the last time in response to a user's indication that the speech recognition for recognizing a name of a user-input-target facility by the speech recognition section results in erroneous recognition multiple times in a row. The external-byname providing section is connectable with an external information center. When the comparison section determines that the speech data inputted the last time substantially matches the speech data inputted the time before the last time, the external-byname providing section transmits information on a present position of the vehicle to the external information center, and causes the external information center to search a first database, which is a database of facilities having bynames, to acquire a list of bynames of facilities that exists around the present position of the vehicle. The external-byname providing section receives the list of bynames from the external information center, and displays the received list of bynames with a display device.

According to a third aspect of the present disclosure, a speech recognition apparatus for a vehicle includes a speech recognition section and a comparison section. The speech recognition section performs digital conversion to convert a speech signal, which is inputted via a microphone from a user, into a speech data, and performs speech recognition based on the speech data. The comparison section makes a comparison between the speech data inputted the last time and the speech data inputted the time before the last time in response to a user's indication that the speech recognition for recognizing a name of a user-input-target facility by the speech recognition section results in erroneous recognition multiple times in a row. The speech recognition apparatus further includes a database of facilities having bynames, and an internal-byname providing section that acquires a list of bynames of facilities existing around a present position of the vehicle by searching the database of bynames and provides the user with the acquired list when the comparison section determines that the speech data inputted the last time substantially matches the speech data inputted the time before the last time.

According to a fourth aspect of the present disclosure, a speech recognition apparatus includes a speech recognition section, a comparison section and a position information providing section. The speech recognition section performs digital conversion to convert a speech signal, which is inputted via a microphone from a user, into a speech data, and performs speech recognition based on the speech data. The comparison section makes a comparison between the speech data inputted the last time and the speech data inputted the time before the last time in response to a user's indication that the speech recognition for recognizing a name of a user-input-target facility by the speech recognition section results in erroneous recognition multiple times in a row, wherein the user-input-target facility is a specific facility that the user would like to input. The position information providing section is communicable with an external information center. When the comparison section determines that the speech data inputted the last time substantially matches the speech data inputted the time before the last time, the position information providing section transmits the speech data to the external information center, causes the external information center to perform the speech recognition based on the transmitted speech data, causes the external information center to acquire positional information of the user-input-target facility as a result of the speech recognition, receives the positional information of the user-input-target facility from the external information center, and provides the user with the acquired positional information of the user-input-target facility. Alternatively, when the comparison section determines that the speech data inputted the last time substantially matches the speech data inputted the time before the last time, the position information providing section may performs the followings. The position information providing section transmits a character string, into which the speech data is converted, and a present position of the vehicle to the external information center, and causes the external information center to search a first database, which is a database of facilities having bynames, by using the character string and the present poison of the vehicle to acquire a list of similar bynames of facilities existing around the vehicle. Further, the position information providing section receives the list of similar bynames of facilities existing around the vehicle from the external information center, and provides the user with the received list.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described based on the accompanying drawings.

First Embodiment

Figure 1:
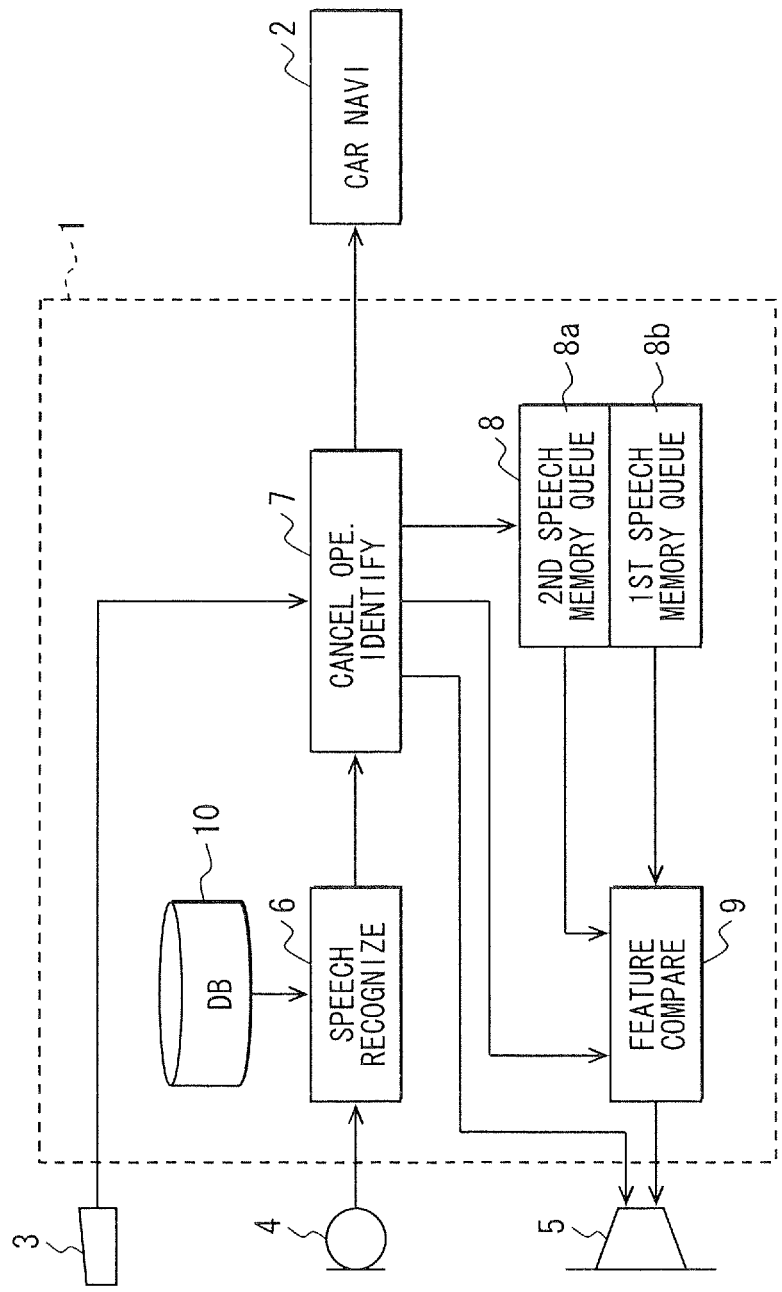
FIG. 1 is a block diagram illustrating a speech recognition apparatus of a first embodiment.
Figure 2:
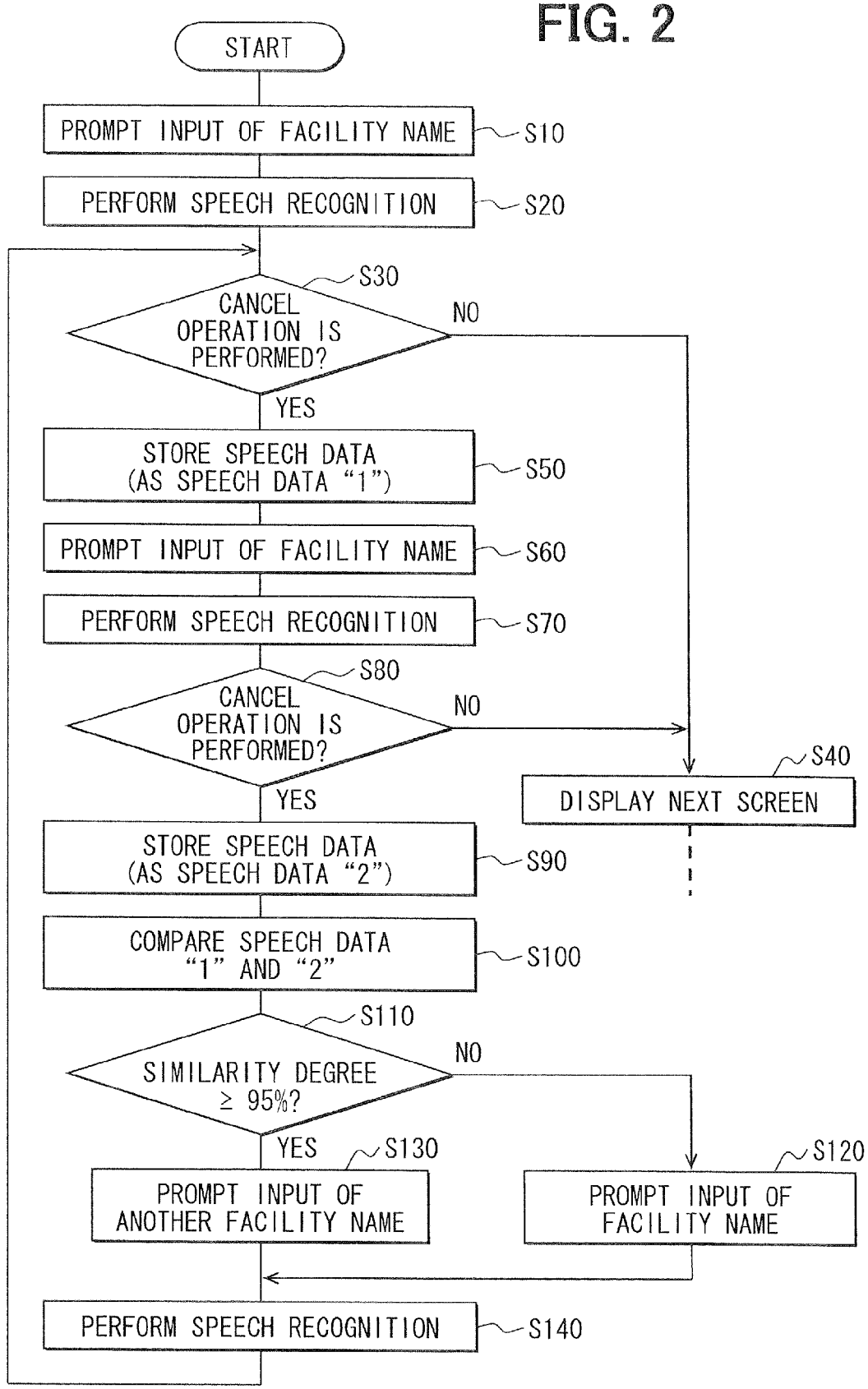
FIG. 2 is a flowchart illustrating a control operation of the speech recognition apparatus of the first embodiment.

A first embodiment will be described with reference to FIGS. 1 and 2. FIG. 1 a block diagram illustrating a system including a control apparatus 1 (referred also to herein as speech recognition apparatus) having a speech recognition function. The control apparatus 1 is mounted in a vehicle (e.g., automobile). The control apparatus 1 has a function to control a car navigation apparatus 2 while communicating with a passenger (user) of the vehicle through speech. The car navigation apparatus 2 is also mounted in the vehicle.

As shown in FIG. 1, the control apparatus 1 is connected with a switch 3, a microphone 4, a speaker 5, and the car navigation apparatus 2. The switch 3 is manipulatable by the user so that the user can input various commands (including an operation needed in inputting the speech), various data and the like. The microphone 4 is provided to input the speech. The speaker 5 is provided to output the speech. The car navigation apparatus 2 performs various navigation-related operations such as detecting present position of the vehicle, performing route guidance, and the like.

Figure 11:
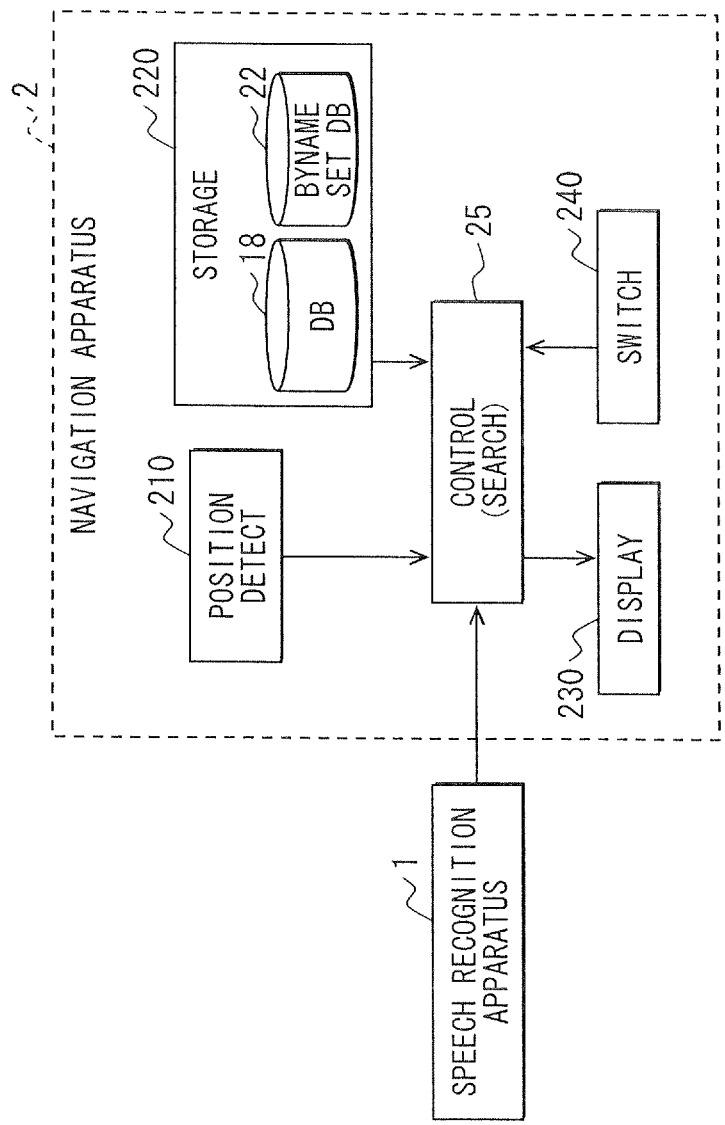
FIG. 11 is a block diagram illustrating a navigation apparatus.

The car navigation apparatus 2 includes a position detector 210, a storage device 220, a display device 230, an operation switch 240, and a controller 25 for controlling the foregoing components. The position detector 210 includes, for example, a GPS device for detecting present position of the vehicle (see FIGS. 5 and 11). The storage device 220 includes, for example, CD, DVD, HD, flash memory or the like for storing a data for route guidance such as a map data, a place name data and the like. The storage device 220 may include a DB 18 and a byname database 22, which will be described later. The display device 230 includes, for example, a liquid crystal display for displaying various images such as roam map and the like. The operation switch 240 enables a user to input commands. The controller 25 includes, for example, a microcomputer with a CPU (central processing unit), a ROM (read-only memory), and RAM (random-access memory). The controller 25 may generally control operation of the car navigation apparatus 2 according to a computer program stored in the ROM. The car navigation apparatus 2 has a route guidance function. For example, when a user inputs a command via the operation switch 240 and instructs the route guidance from a departure point to a destination point, the car navigation apparatus 2 performs the route guidance by displaying a road map, a mark indicating the present position of the vehicle, and an optimum route leading to the destination point on the display device 230.

The display device 230 of the car navigation apparatus 2 displays not only the road map for route guidance but also various images such as a menu for information search and the like. In an example of the present embodiment, although the control apparatus 1 and the car navigation apparatus 2 are separated, the control apparatus 1 (called also a speech recognition apparatus and a speech output apparatus) may be built in the car navigation apparatus 2.

The control apparatus 1 includes a speech recognition section 6, a cancel operation identification section 7, a speech storage 8, and a feature comparison section 9. The speech recognition section 6 converts (A/D conversion) a speech signal, which is inputted from the microphone 4, into a digital speech data. Based on this speech data and a database 10 for speech recognition, the speech recognition section 6 performs the speech recognition. Further, the speech recognition section 6 extracts a feature of the speech data, and transmits a result of the speech recognition and the feature of the speech data to the cancel operation identification section 7. The speech recognition section 6 can correspond to a speech recognition means. For example, the control apparatus 1 may include a microcomputer with a CPU (central processing unit), a ROM (read-only memory), and RAM (random-access memory). The CPU may performs predetermined processes according to a computer program stored in the ROM.

The cancel operation identification section 7 receives the result of the speech recognition and the feature of the speech data. The cancel operation identification section 7 transmits the result of the speech recognition to the speaker 5, so that the speaker 5 outputs the result of the speech recognition as a speech output. The cancel operation identification section 7 records and stores the feature of the speech data in the speech storage 8. The speech storage 8 has two speech memory queues 8a, 8b. The feature of the latest speech data (i.e., speech data inputted the last time) and the feature of the second latest speech data (i.e., speech data inputted the time before the last time) are stored in the two speech memory queues 8a, 8b, respectively. The feature of the speech data older than the second latest data is deleted from two speech memory queues 8a, 8b.

When the speaker 5 outputs a result of the speech recognition, and when the user hears that the result of the speech recognition is inconsistent with (different from) the speech spoken by himself or herself, a cancel switch of the switch 3 is manipulated by the user. In response to user's manipulation on the cancel switch, a switch signal is outputted from the cancel switch to the cancel operation identification section 7. Upon receiving the switch signal, the cancel operation identification section 7 outputs a command signal commanding the feature comparison section 9 to make a comparison between the features of the two speech data stored in the speech storage 8. By contrast, when the switch signal of the cancel switch is not transmitted to the cancel operation identification section 7 (or when the user operates a normal recognition switch of the switch 3 and a switch signal of the normal recognition switch is transmitted to the cancel operation identification section 7), the cancel operation identification section 7 deletes the features of the speech data stored in the speech memory queues 8a, 8b of the speech storage 8, and transmits the result of the speech recognition to the car navigation apparatus 2.

In response to receiving the command, the feature comparison section 9 makes the comparison between the features of the two speech data when the features of the two speech data are stored in the speech storage 8. When the features of the two speech data do not match each other (e.g., when a degree of similarity is less than 95%), the feature comparison section 9 does nothing special. By contrast, when the features of the two speech data match each other (e.g., when the degree of similarity is greater than or equal to 95%), the feature comparison section 9 determines that the user is repeatedly uttering the same word (e.g., facility name etc.), and the feature comparison section 9 outputs a guidance speech from the speaker, so that the guide speech corresponds a message prompting the user to speak the facility by calling the facility by another name. An example of the message is that "it is likely that the name you uttered is not registered; please call it by another name". The feature comparison section 9 can correspond to a comparison means or section, and a guidance output means or section.

Operation of the above control apparatus 1 will be described with reference to a flowchart of FIG. 2. At S10, the cancel operation identification section 7 of the control apparatus 1 causes the speaker 5 to output a guidance speech prompting an input of a name of a facility. At S20, the speech recognition section 6 receives the user-uttered speech via the microphone 4, performs a speech recognition operation, and extracts a feature of the speech data. Further, the cancel operation identification section 7 causes the speaker 5 to output a result of the speech recognition of the speech recognition section 6.

Then, at S30, the cancel operation identification section 7 determines whether the cancel switch is manipulated by the user. When it is determined that the cancel switch is not manipulated by the user, in other words, when the speech recognition has been successfully performed, the determination "NO" is made at S30, and the process proceeds to S40. At S40, display is moved to a next screen, and then, a usual normal operation is performed.

When it is determined at S30 that the cancel switch is manipulated by the user, in other words, when the speech recognition has been unsuccessfully performed (i.e., when the speech recognition results in erroneous recognition), the determination "YES" is made at S30, and the process proceeds to S50. At S50, the cancel operation identification section 7 records the feature of the speech data extracted from the speech data used in the above speech recognition, so that the feature of the speech data is stored in the first speech memory queue 8a of the speech storage 8. This stored data is referred to as speech data "1".

At S60, the cancel operation identification section 7 causes the speaker 5 to output a guidance speech prompting the input of the name of the facility. At S70, the speech recognition section 6 receives the user-uttered speech via the microphone 4, performs a speech recognition operation, and extracts a feature of the speech data. In addition, the cancel operation identification section 7 causes the speaker 5 to output a result of the speech recognition of the speech recognition section 6.

At S80, the cancel operation identification section 7 determines whether the cancel switch is manipulated by the user. When it is determined that the cancel switch is not manipulated by the user, in other words, when the speech recognition has been successfully performed, the determination "NO" is made at S80, and the process proceeds to S40. At S40, the display is moved to the next screen, and then, the usual normal operation is performed.

When it is determined at S80 that the cancel switch is manipulated by the user, in other words, when the speech recognition has been unsuccessfully performed (i.e., when the user indicates that the speech recognition results in erroneous recognition multiple times in a row), the determination "YES" is made at S80, and the process proceeds to S90. At S90, the cancel operation identification section 7 records the feature of the speech data extracted from the speech data used in the above speech recognition, so that the feature of the speech data is stored in the first speech memory queue 8a of the speech storage 8. This stored data is referred to as "speech data 2". In this case, the speech data previously stored in the first speech memory queue 8a before the process S90 is moved to and stored in the second speech memory queue 8b. That is, the two speech memory queues 8a, 8b store the features of the latest speech data (i.e., the speech data inputted the last time) and the feature of the second latest speech data (i.e., the speech data inputted the time before the last time), respectively. The latest speech data is also referred to as "speech data 2". The second latest speech data is also referred to as "speech data 1".

Then, a feature of a further-new speech data may be recorded and stored in the speech storage 8. In this case, the feature of the further-new speech data, which is presently latest, and the feature of the second latest speech data are respectively stored in the two speech memory queues 8a, 8b, and the feature of the speech data older than the above two is deleted. In the above, the deleted speech data is the third latest speech data, which was inputted the time prior to the previous time. Then, a process of storing the features of the two latest speech data in the two speech memory queues 8a, 8b is repeated.

At S100, the feature comparison section 9 makes a comparison between the feature of the speech data (speech data 1) stored in the first speech memory queue 8a and the feature of the speech data (speech data 2) stored in the second speech memory queue 8b. At S110, it is determined whether the degree of similarity between the two speech data 1 and 2 is greater than or equal to a predetermined degree of, for example, 95%. When it is determined that the degree of similarity is greater than or equal to the predetermined degree (e.g., 95%), it can be determined that the same facility name was repeatedly uttered by the user. In this case, the determination "YES" is made at S110, and the process proceeds to S130. At S130, the cancel operation identification section 7 causes the speaker 5 to output a massage prompting the user to speak the facility by calling it by another name. For example, the speaker 5 outputs a massage "it is likely that the name you spoke may not be registered; please speak it by another name".

When it is determined at S110 that the degree of similarity between the two speech data is not greater than or equal to the predetermined degree (e.g., 95%), it can be determined that the user did not repeatedly speak the same facility name, that is, the user spoke the different facility names. In this case, the determination "NO" is made at S110 and the process proceeds to S120. At S120, the cancel operation identification section 7 causes the speaker 5 to output a guidance prompting the user to input (speak) the facility name.

At S140, the speech recognition section 6 receives the spoken speech inputted from the user via the microphone 4, performs the speech recognition, and extracts the feature of the speech data. In addition, the cancel operation identification section 7 causes the speaker 5 to output a result of the speech recognition of the speech recognition section 6. Then, the process proceeds to S30, so that the above-described steps are repeatedly performed.

In the present embodiment, the control apparatus 1 is configured as follows. When the user speaks a name of an input-target facility etc., the error recognition or failure of the speech recognition may occur multiple times (e.g., two times) in a row if the spoken name of the input-target facility is not registered in the database. In this case, it is determined whether a "same word" is spoken by the user the multiple times in a row. When it is determined that the "same word" is spoken by the user multiple times in a row, the speaker 5 outputs a guidance speech messages that prompts the user to speak the input-target facility etc. by calling it by another name. For example, the speaker 5 outputs the massage indicating that "the name you spoke is not registered; please speak by calling it another name". According to the above configuration, it becomes possible to let the user speak the name of the facility that is registered in the database 10. Thus, it is possible to prevent the erroneous recognition from continuing, prevent the user from giving up using the speech recognition apparatus, and prevent the user from getting a bad impression of the speech recognition apparatus.

In the above example, when the erroneous recognition occurs multiple times in a row, and when it is determined that the "same word" is spoken by the user multiple times in a row, the speech guidance is outputted to prompt the user to speak the facility name by calling it by another name. Alternatively, the control apparatus 1 may be configured as follows. In place of or in addition to the speech guidance, the feature comparison section 9 may make a list (name list) of names of facilities existing in an area in the vicinity of the present position of the vehicle, and the feature comparison section 9 may cause the display device 230 to display the list.

For example, the list may be displayed together with the guidance indicating that: there are these facilities around the present position; what you had tried to input may be one of nicknames of these facilities; please input again by referring to these.

In the above configuration, when a popular name (nickname) "Yokohama red brick warehouse", which is not registered in the database 10, is spoken by the user multiple times in a row for example, the display device 230 may display its official name "New-port in-bound warehouse" as one of facilities in the list on assumption that this official name (proper name) of this "Yokohama red brick warehouse" is registered in the database (dictionary). Thus, as long as the user knows the official name of "Yokohama red brick warehouse", the user can selects and inputs its official name "New-port in-bound warehouse" by seeing the displayed official name. In the above example, the display device 230 displays the list of names of facilities existing in an area in the vicinity of the present position of the vehicle. Alternately, the control apparatus 1 may be configured as follows. In place of or in addition to the display of the list, the names of the facilities in the area in the vicinity of the present position of the vehicle may be read aloud as a speech output in order of, for example, increasing distance from the present position of the vehicle.

In this configuration, when it just happens that an official name of a facility slips user's mind and that the user remembers the popular name of the facility not registered in the database (it is assumed that the user could remember an official name of a facility registered in the database in the usual case), the user is provided with the list that possibly contains the official name. The user is provided with a greater opportunity to input a command about the facility by speech input.

For example, the user is provided with an increased possibility to remember that the facility having a common name "Yokohama red brick warehouse" has an official name called "New-port in-bound warehouse", and accordingly, the user can speak and input the facility with its official name registered in the database. That is, it is possible to increase the opportunity and possibility for the user to successfully input a command about the facility by speech input.

Alternatively, the control apparatus 1 may be configured as follows. When the erroneous recognition occurs multiple times in a row, and when it is determined that the "same word" is repeatedly spoken by the user, the control apparatus 1 (feature comparison section 9) may connect to an external server (information center 11) via Internet, may make a search by using a feature of the speech data of the user-spoken speech as a search key to retrieve content, and causes the display device 230 to display the retrieved content. In this configuration, the user can select and input the name of the user-input-target facility by seeing the displayed content. In making the search by using the feature of the speech data as the search key, the control apparatus 1 may use a speech search solution such as voice searcher or the like, which enables a search for "a word" with "a raw speech".

Alternatively, the control apparatus 1 may be configured as follows. When name of a user-input-target facility, which the user would like to input, is inputted as a first speech input, the speech recognition section 6 recognizes the first speech input and refers to the dictionary of the database 10 to determine whether a facility name coinciding with the first speech input exists in the dictionary. When the speech recognition section 6 determines that the facility name coinciding with the first speech input does not exist in the dictionary, the feature comparison section 9 notifies the user that the facility name coinciding with the first speech input does not exist in the dictionary. Further, the feature comparison section 9 stores the first speech input and prompts the user to re-input the user-input-target facility as a second speech input. When the speech recognition section 6 determines that the facility name coinciding with the second speech input does not exist in the dictionary, the feature comparison section 9 makes the comparison between a data of the first speech input and a data of the second speech input. When the feature comparison section 9 determines that the data of the first speech input substantially matches the data of the second speech input, the feature comparison section 9 prompts the user to utter the user-input-target facility by calling the user-input-target facility by the another name.

Second Embodiment

Figure 3:
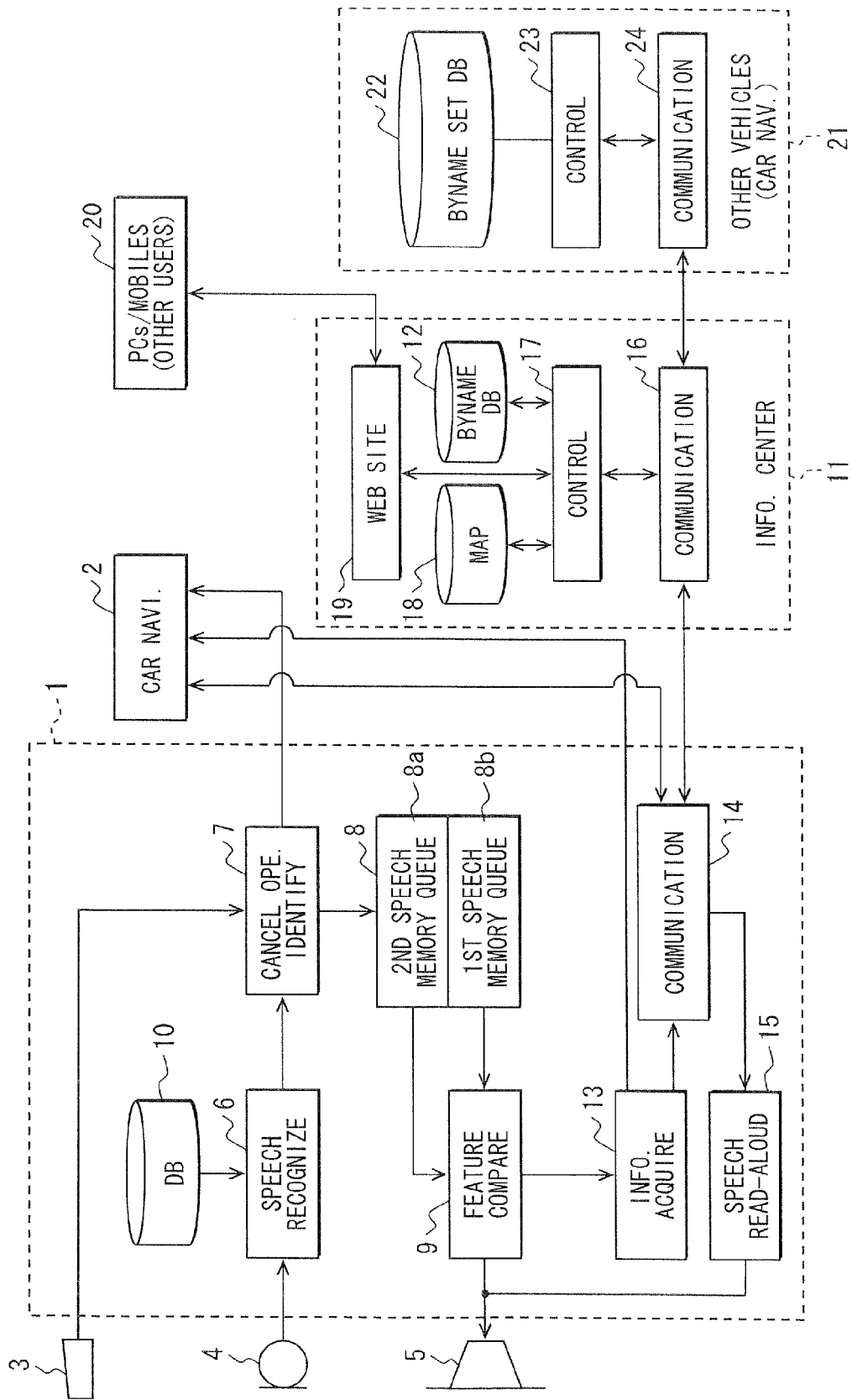
FIG. 3 is a block diagram illustrating a speech recognition apparatus of a second embodiment.
Figure 4:
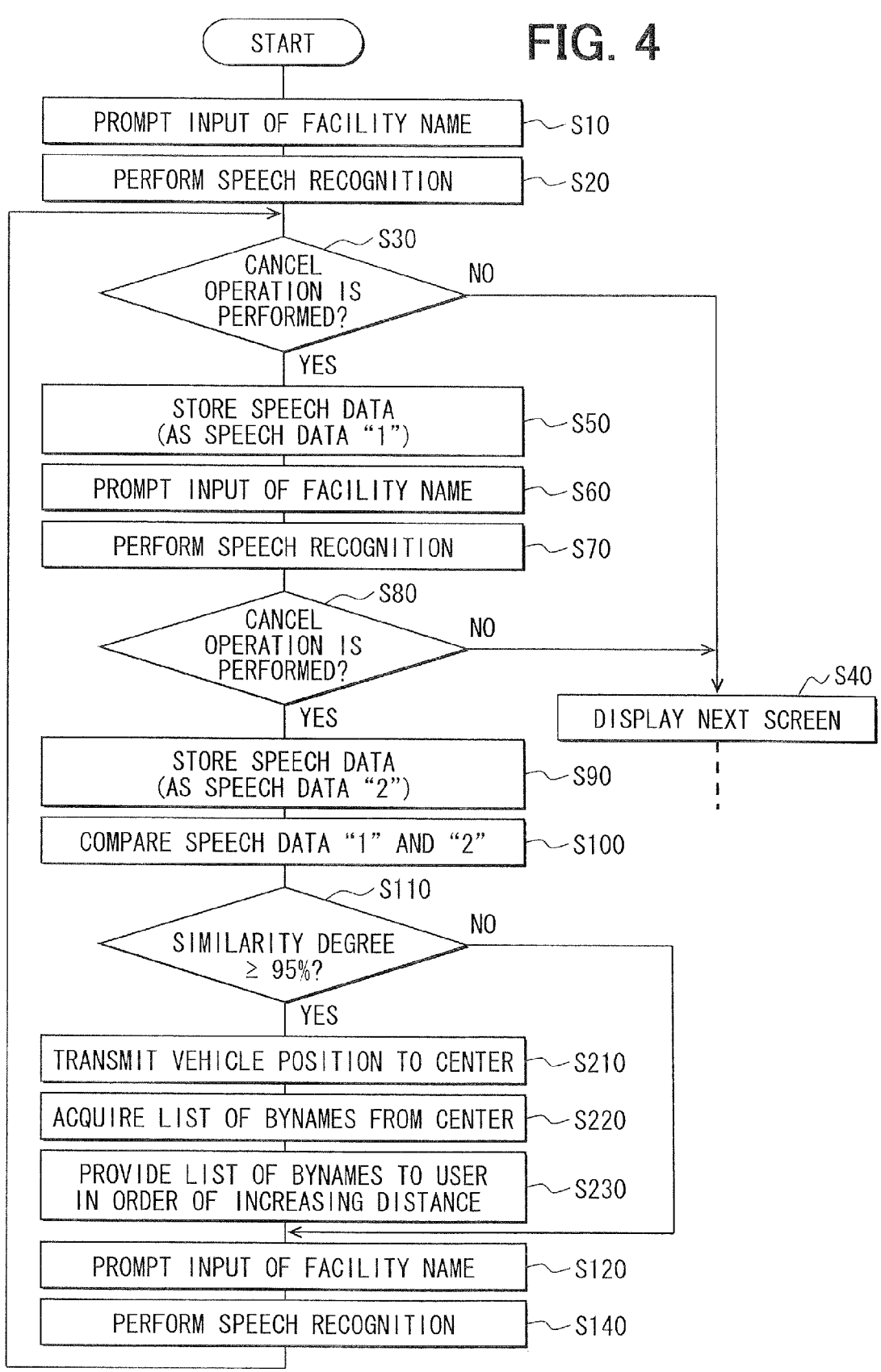
FIG. 4 is a flowchart illustrating a control operation of the speech recognition apparatus of the second embodiment.

FIGS. 3 and 4 illustrate a communication system for a vehicle in accordance with a second embodiment. Between the first and second embodiments, like references are used to refer to like parts. In the second embodiment, as shown in FIG. 3, an external information center 11 includes a database 12 (also called "byname database 12") of facilities having bynames such as common name, nickname and the like. By searching the byname database 12, it is possible to acquire a list of bynames of facilities existing around the present position of the vehicle. The control apparatus 1 reads aloud this list, or displays the list with the display device 230 of the vehicle. In the list of bynames of facilities, the byname, the official name registered in the dictionary and the positional information are associated with each other. Both of the byname and the official name are displayed. In the case of the above configuration, the communication system for a vehicle includes a control apparatus 1, the car navigation apparatus 2 and the information center 11.

Specifically, as shown in FIG. 3, the control apparatus 1 of the vehicle includes an information acquisition section 13 for acquiring information on the present position of the vehicle etc., a communication device 14 for performing communications through connecting to, for example, a cellular phone network, and a speech read-aloud section 15. The information acquisition section 13 acquires the information on the present position of the vehicle (referred to as the vehicle position) from the car navigation apparatus 2, and transmits the acquired vehicle position to the information center 11 via the communication device 14. The speech read-aloud section 15 receives a list of bynames of facilities, which is made by the information center 11 in the below-described manner, via the communication device 14 from the information center 11.

The speech read-aloud section 15 reads aloud (provides) the received list of bynames of facilities as a speech output from the speaker 5. The received list of bynames of facilities is transmitted to the car navigation apparatus 2 and displayed (provided to the user) with the display device 230. In this case, the control apparatus 1 and the car navigation apparatus 2 can correspond to an external-byname providing means or section. Alternatively, the information acquisition section 13, the communication device 14 and the speech read-aloud section 15 may correspond to an external-byname providing means or section.

The information center 11 includes a communication device 16 connectable to, for example, a cellular phone network, a controller 17, a byname database 12, a map database 18, and a web (WWW) site 19. The controller 17 receives the information on the vehicle position transmitted from the control apparatus 1 of the vehicle, and searches the byname database 12 with the received vehicle position. The controller 17 acquires a list of bynames of facilities (a list of bynames of facility names) existing around the vehicle position, e.g., existing within a predetermined radius (e.g., approximately 10 km to 20 km) from the vehicle position. Then, the controller 17 transmits the acquired list of bynames of facilities to the control apparatus 1 of the vehicle via the communication device 16.

The information center 11 creates, accumulates and extends the data of the byname database 12 in the below-described manner. As shown in FIG. 3, a frequently-used common-name or nickname of a local facility, which may be the most-frequency-used byname, is collected in the information center 11 in such way that an unspecified number of users (also referred to as "other users") access, for example, the web site 19 of the information center 11 via Internet from their personal computers (PCs) or mobiles. The controller 17 of the information center 11 registers the collected common name or nickname (which may be rated the most-frequently-used name) in the byname database 12 while associating the collected common name or nickname with the official name. The registered byname is associated with (connected to) the map data (facility position information), so that the list of byname of facilities around the vehicle can be easily acquired.

As shown in FIG. 3, car navigation apparatuses 21 mounted to other vehicles include a user-settable byname set database 22. A name or an abbreviated name frequently used by the user in speech recognition is arbitrarily registered in the byname set database 22 by the user. The information center 11 collects the data of the byname set databases 22 of the car navigation apparatuses 21 of a large number of vehicles, and registers the collected data in the byname database 12. Specifically, when a controller 23 of the car navigation apparatus 21 receives a collection command from the information center 11 via a communication device 24, the controller 23 transmits the data of the byname set database 22 to the information center 11 via the communication device 24. The communication device 24 has a function to communicate through connecting to, for example, a cellular phone network.

When the controller 17 of the information center 11 receives the data of the byname set database 22 of the car navigation apparatus 21 via the communication device 16, the controller 17 stores the received data. When there are similar names (fuzzy coincidence) among two or more vehicles, the similar names are registered as the bynames in the byname database 12 while being associated with the official names. The registered byname is associated with (connected to) the map data (facility position information), so that the list of byname of facilities around the vehicle can be easily acquired.

Next, operation of the control apparatus 1 of the second embodiment will be described with reference to the flowchart of FIG. 4. Between the flowcharts of the first and second embodiments, like references are used to refer to like steps. Since steps S10 to S110, S120 and S140 of FIG. 4 of the present embodiment can be substantially the same of those of FIG. 2 of the first embodiment, other steps will be mainly described below.

When it is determined that the degree of similarity between the two speech data "1" and "2" is greater than or equal to the predetermined degree (e.g., 95%), it can be determined that the same facility name is spoken by the user multiple times in a row. In this case, the determination "YES" is made at S110 and the process proceeds to S210. At S210, the control apparatus 1 transmits the information on the present position of the vehicle (vehicle position) to the information center 11. Then, the control apparatus 1 waits for the information center 11 to transmit the list of bynames of facilities existing around the vehicle position.

When receiving the information on the vehicle position, the information center 11 searches the byname database 12 based on the information on the vehicle position, thereby acquiring the list of bynames of facilities existing around the vehicle position. The information center 11 transmits a data of the acquired list of bynames of facilities to the control apparatus 1 of the vehicle. The data of the acquired list of bynames of facilities is rearranged in order of increasing distance from the vehicle. Official names and positional information of facilities (facility location information) are attached to the data of the list and associated with the bynames in the list.

At S220, the information acquisition section 13 of the control apparatus 1 of the vehicle receives (acquires) the data of the list of bynames of facilities transmitted from the information center 11. At S230, the speech read-aloud section 15 reads aloud the received data of the list of bynames of facilities in order of increasing distance from the vehicle position, so that it is outputted (provided) from the speaker 5 as a speech output. As well as this speech output, the received data of the list of bynames of facilities is transmitted to the car navigation apparatus 2 of the vehicle, so that the display device 230 displays (provides) the list of bynames of facilities in order of increasing distance from the vehicle position. In displaying the list, the facility names (official names) registered in the database 10 of the speech recognition apparatus of the user and corresponding common names (nicknames or bynames not registered in the database 10) are arranged in pairs.

In addition to displaying the list, it may be preferable to perform a speech guidance etc. indicating that: "a list of facilities around the present position is displayed; the facilities are also called by the displayed nicknames or popular names; if the facility name you are trying to input is the nickname or popular name in this list, please input its official name.

Then, the process proceeds to S120 where the speaker 5 outputs the guidance speech prompting the user to input (speak) the facility name. Then, the process proceeds to S140 to perform the speech recognition. Subsequent steps can be the same as those of the first embodiment.

In the present embodiment, when the user completely does not know an official name of a facility that is registered in the dictionary (database 10) while remembering a common name of the facility that is not registered in the dictionary, the user is provided with an increased chance to input a command about the facility by speech input.

When the example of the first embodiment is referred to, the user is provided with an increased possibility to become aware that a facility having a common name "Yokohama red brick warehouse" has an official name "new-port in-bound warehouse", and the user is provided with an increased possibility to perform speech input with the official name registered in the dictionary. That is, the user is provided with an increased chance to successfully input a command about the facility by speech input.

In displaying the list, it may be preferable to display the name registered in the dictionary and the name not registered in the dictionary distinguishably from each other. In this case, when the list includes an official name of a certain facility registered in the dictionary, and when the user had tried to input the certain facility by using a name not registered in the dictionary, the user can become aware that the name of the certain facility he or she had tried to input is not registered in the dictionary. In this way, the user can easily input the facility with the registered official name.

When acquiring the information on other users (other vehicles) via the center, the control apparatus 1 may selectively acquire the information on people whose daily acting range is around the present position of the vehicle. This is because it is highly likely that the people whose daily acting range is around the present position of the vehicle is local people and changes the facility name into a nickname (e.g., change "New-port in-bound warehouse" into a "Yokohama red brick warehouse" or "red brick warehouse").

In the second embodiment, the control apparatus 1 is configured as follows. When the erroneous recognition occurs multiple times in a row, and when it is determined that the "same word" is spoken by the user multiple times in a row, the control apparatus 1 transmits the present position of the vehicle to the external information center 11, causes the information center 11 to search the byname database 12 and acquire a list of bynames of facilities existing around the present position of the vehicle. The control apparatus 1 receives the list, and reads aloud the list or display the list with the display device 230 of the vehicle. In this configuration, when the list of bynames of facilities is displayed or read aloud, the user can see a correspondence between the byname and the official name registered in the database 10 (dictionary) of the speech recognition apparatus, and the user can selectively speak the official name corresponding to the byname. In this way, it is possible to perform the speech recognition of the official name spoken by the user, thereby acquiring the official name and the positional information of the facility (facility location information). Therefore, it is possible to prevent the erroneous recognition from continuing, and it is possible to prevent the user from giving up using the speech recognition apparatus and from getting a bad impression of the speech recognition apparatus.

In the above example of the second embodiment, the control apparatus 1 acquires the list of bynames of facilities existing around the present position of the vehicle by collecting the information from other persons via the information center 11, and displays or reads aloud this list. Alternatively, the control apparatus 1 may be configured as follows. For example, the names (bynames) that are in the acquired list and are not registered in the dictionary may be converted into a speech data, and the converted speech data may be automatically registered in the dictionary for speech recognition in the database 10 while being connected to the registered data of the formal names and facility locations. In this configuration, when the user selectively speaks the byname, the control apparatus 1 can recognize the spoken byname by the speech recognition based on the received data of the list of bynames or the dictionary of the database 10, and the control apparatus 1 can acquire the official name and the positional information of the facility (facility location information).

The control apparatus 1 of the present embodiment may be configured as follows. When the user inputs the user-input-target facility as a first speech input by uttering the name of the user-input-target facility, the speech recognition section 6 recognizes the first speech input and refers to the dictionary of the second database 10 to determine whether a facility name coinciding with the first speech input exists in the dictionary. When the speech recognition section 6 determines that the facility name coinciding with the first speech input does not exist in the dictionary, the control apparatus 1 (external-byname providing section) notifies the user that the facility name coinciding with the first speech input does not exist in the dictionary. Further, the control apparatus 1 stores the first speech input and prompts the user to re-input the user-input-target facility as a second speech input. When the speech recognition section 6 determines that the facility name coinciding with the second speech input does not exist in the dictionary, the feature comparison section 9 makes the comparison between a data of the first speech input and a data of the second speech input. When the feature comparison section 9 determines that the data of the first speech input substantially matches the data of the second speech input, the control apparatus 1 transmits the information on the present position of the vehicle to the external information center 11, and causes the external information center 11 to search the byname database 12 (also called first database) of the external information center 11 to acquire a list of bynames of facilities existing around the present position of the vehicle. The control apparatus 1 receives the list of bynames from the external information center 11, and displays the received list of bynames with the display device 230. In this configuration, it may be preferable that the control apparatus 1 (external-byname providing section) display a first name set and a second name set in pairs on the display device 230. The first name set is a set of names registered in the dictionary of the second database 10. The second name set is a set of bynames not registered in the dictionary of the second database 10. Alternatively, the control apparatus 1 (external-byname providing section) may display the first name set and the second name set distinguishably from each other on the display device 230.

Third Embodiment

Figure 5:
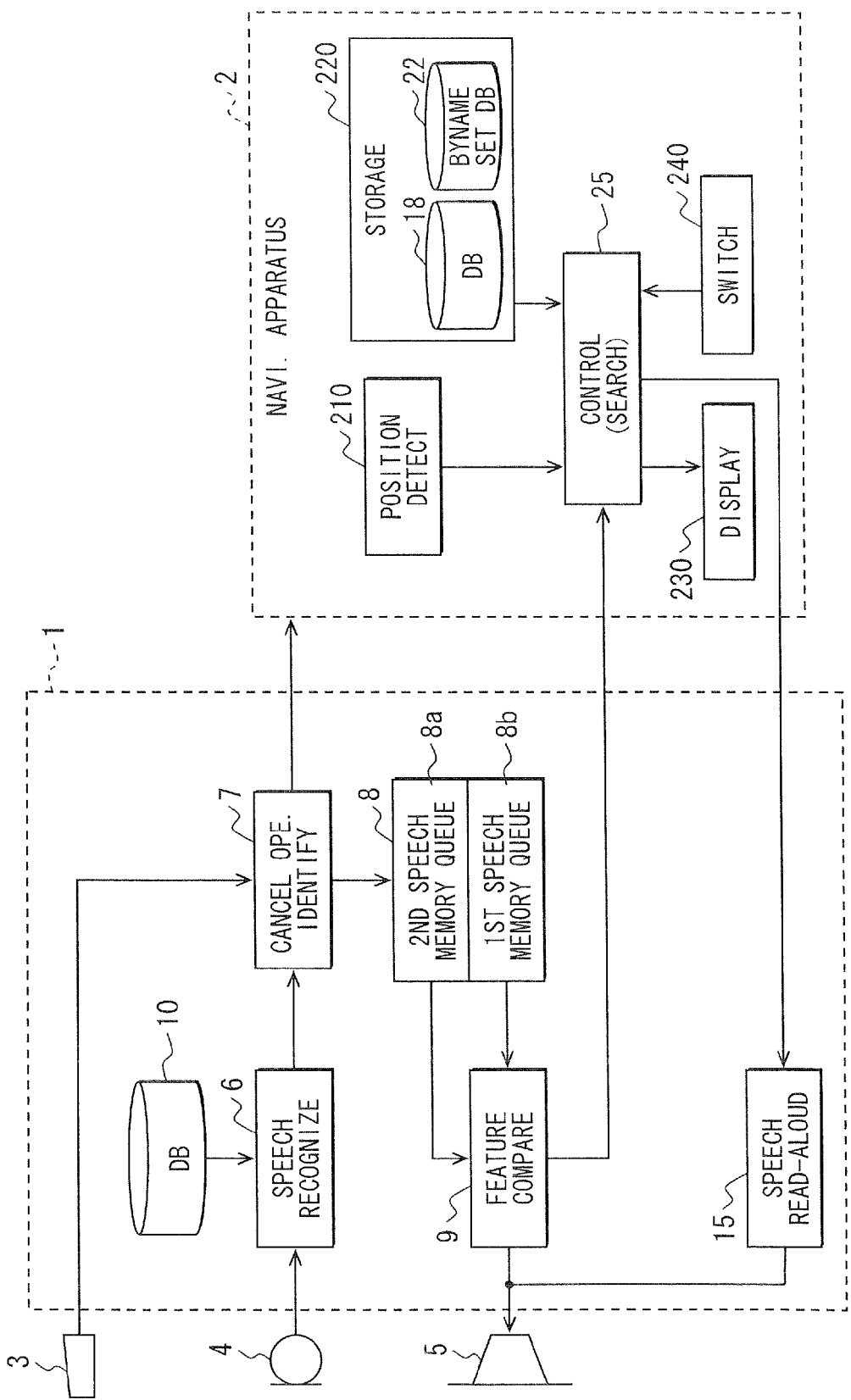
FIG. 5 is a block diagram illustrating a speech recognition apparatus of a third embodiment.

A third embodiment will be described with reference to FIGS. 5 and 6. Between the second and third embodiments, like references are used to refer to like parts. In the third embodiment, as shown in FIG. 5, the car navigation apparatus 2 includes a byname set database 22, which can be made or arranged by the user. For example, the controller 25 (corresponding to the search section 25) of the car navigation apparatus 2 searches the byname set database 22 based on the information on the vehicle position acquired by the position detector 210, and thereby acquiring a list of bynames of facilities existing around the vehicle position (list of bynames of facility names). The list may list up bynames of facilities existing within a predetermined radius, e.g., 10 km to 20 km, from the vehicle position. The speech read-aloud section 15 receives the list of bynames acquired by the search section 25, and outputs (provides) the list as a speech output in order of increasing distance from the vehicle position. As well as the speech output of the list, the display device 230 of the car navigation apparatus 2 displays (provides) the data of the list in order of increasing distance from the vehicle position. In this case, the control apparatus 1 and the car navigation apparatus 2 can correspond to an internal byname providing means or section. Alternatively, the speech read-aloud section 15 may correspond to an internal byname providing means or section Next, operation of the control apparatus 1 of the third embodiment will be described with reference to the flowchart of FIG. 6. Between FIG. 6 and FIG. 3, like references are used to refer to like steps. Since step S10 to S110, S230, S120 and S140 of the present embodiment can be substantially the same as those FIG. 4 of the second embodiment, other steps will be mainly described below.

Figure 6:
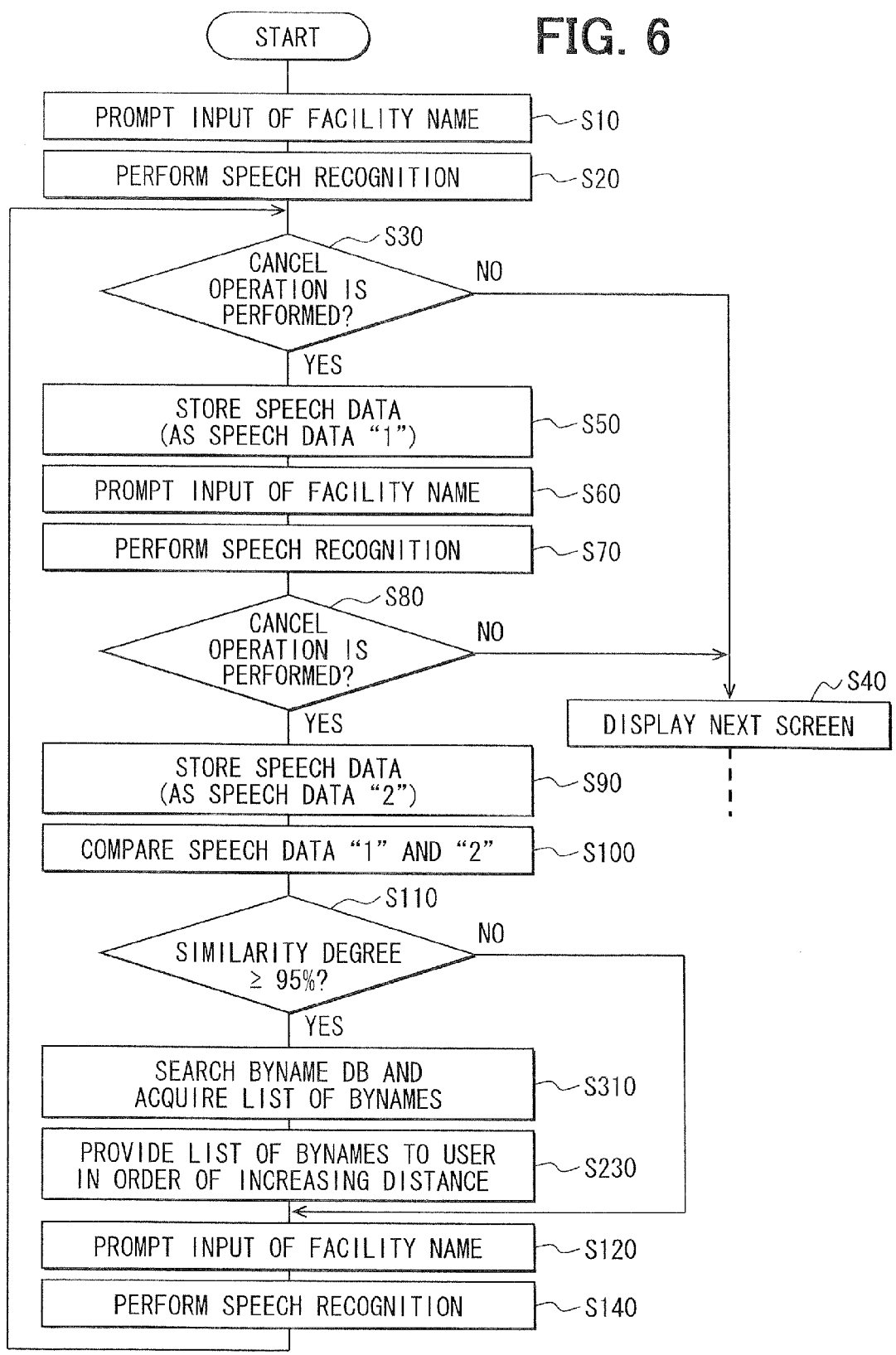
FIG. 6 is a flowchart illustrating a control operation of the speech recognition apparatus of the third embodiment.

When it is determined at S110 of FIG. 6 that the degree of similarity between the two speech data "1" and "2" is greater than the predetermined degree (e.g., 95%), it can be determined that the "same word" is spoken by the user multiple times in a row. In this case, the determination "YES" is made at S110, and the process proceeds to S310. At S310, based on the information on the present position of the vehicle (vehicle position), the control apparatus 1 searches the byname set database 22 and makes a list of bynames of facilities. Then, the process proceeds to S230. Subsequent steps can be substantially the same as those of the second embodiment.

Except for the above-described configuration, the third embodiment can have substantially the same configuration as the second embodiment. Therefore, the third embodiment can achieve substantially the same advantages as the second embodiment.

Fourth Embodiment

A fourth embodiment will be described with reference to FIGS. 8 and 9. Like references are used to refer to like parts. In the fourth embodiment, when the erroneous recognition occurs multiple times in a row and when it is determined that the "same word" is spoken by the user multiple times in a row, the speech data is transmitted to the information center 11, and a speech recognition operation is again performed in the information center 11.

Figure 7:
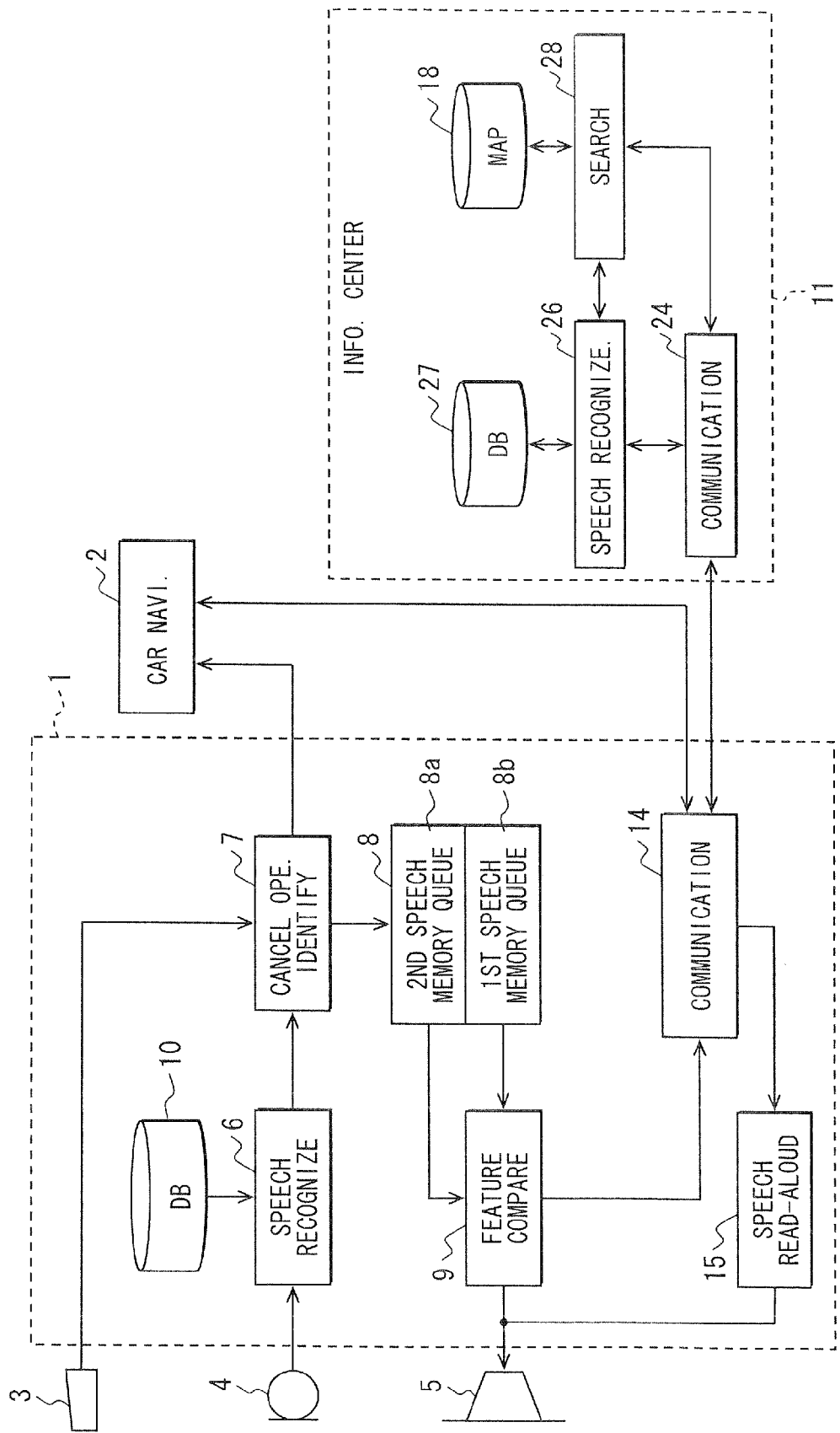
FIG. 7 is a block diagram illustrating a control operation of the speech recognition apparatus of a fourth embodiment.

Specifically, as shown in FIG. 7, when it is determined that the erroneous recognition occurs multiple times in a row, and when the feature comparison section 9 determines that the "same word" is spoken by the user multiple times in a row, the control apparatus 1 transmits the speech data to the information center 11 via the communication device 14. The information center 11 includes a center speech recognition section 26, a database 27 for speech recognition, and a search device 28. When the center speech recognition section 26 receives the speech data from the control apparatus 1 of the vehicle via the communication device 24, the center speech recognition section 26 performs a speech recognition operation on the received speech data based on the database 27 for the speech recognition. In this case, since the database 27 for speech recognition in the information center 11 is huge as compared with the database 10 for speech recognition in the vehicle, it is possible to perform the speech recognition with high accuracy.

A result of the speech recognition of the center speech recognition section 26 is transmitted to the search device 28. Based on the result of the speech recognition such as name or byname of facility etc., the search device 28 searches the map database 18 and acquires positional information of the facility etc. indicated by the result of the speech recognition. For example, the search device 28 acquires information on latitude and longitude and/or map code of the facility etc. Further, the search device 28 transmits the acquired information on latitude and longitude and/or map code and the result of the speech recognition (name of facility etc.) to the control apparatus 1 via the communication device 24. When the control apparatus 1 of the vehicle receives the information on the latitude and longitude and/or map code, and the result of the speech recognition (name of facility etc.) from the information center 11 via the communication device 14, the control apparatus 1 displays a point indicated by the latitude and longitude and/or map code as well as a map on the display device 230. The speech read-aloud section 15 of the control apparatus 1 of the vehicle reads aloud the received result of the speech recognition (e.g., the facility name etc.,) as a speech output from the speaker 5, and the speech read-aloud section 15 outputs a speech message asking permission to set the destination point to the point displayed on the display device 230. When the user gives (answers) the permission to set the destination point to the point displayed on the display device 230, the car navigation apparatus 2 sets the destination point to the point displayed on the display device 230. In this case, the control apparatus 1 and the car navigation apparatus 2 can correspond to a position information providing section or means, or an external position information providing section or means. Alternatively, the communication device 14 and the speech read-aloud section 15 may correspond to a position information providing section or means, or an external position information providing section or means, Next, operation of the control apparatus 1 of the fourth embodiment will be described with reference to the flowchart of FIG. 8. Like references are used to refer to like steps between the present embodiment and the second embodiment. Since steps S10 to S110, S230, S120 and S140 of the present embodiment can be substantially the same as those in the flowchart of FIG. 4 of the second embodiment, other steps will be mainly described given.

Figure 8:
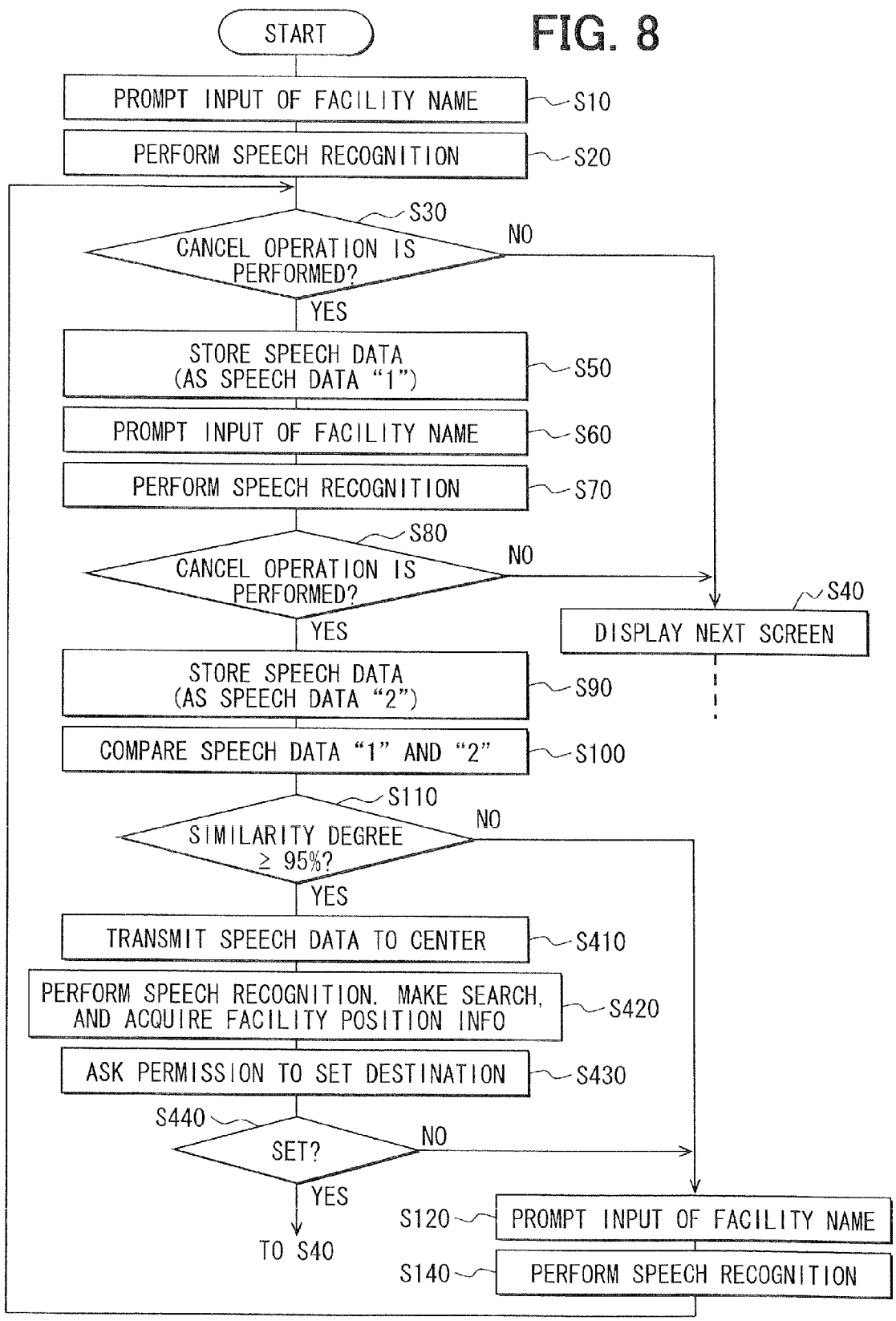
FIG. 8 is a flowchart illustrating a control operation of the speech recognition apparatus of the fourth embodiment.

When it is determined at S110 of FIG. 8 that the degree of similarity between the two speech data "1" and "2" is greater than the predetermined degree (e.g., 95%), it can be determined that the "same word" is spoken by the user multiple times in a row. In this case, the determination "YES" is made at S110, and the process proceeds to S410. At S410, the control apparatus 1 transmits the speech data (i.e., one of the two speech data "1" and "2") to the information center 11. Then, the control apparatus 1 waits for the information center 11 to transmit the information on latitude and longitude and/or map code and the result of the speech recognition (facility name etc.).

When the information center 11 receives the information on the speech data, a speech recognition operation is again performed on the received speech data by the information center 11 based on the database 27 for speech recognition. Then, the information center 11 searches the map database based on a result of this speech recognition (i.e., name of facility etc. such as byname and the like), thereby acquiring the positional information of the facility etc. as a result of the speech recognition. That is, the information center 11 acquires the information on latitude and longitude and/or map code. Further, the information center 11 transmits the information on latitude and longitude and/or map code, and the result of the speech recognition (i.e., name of facility etc) to the control apparatus 1 of the vehicle.

Then, at S420, the control apparatus 1 of the vehicle receives and acquires the information on latitude and longitude and/or map code, and the result of the speech recognition (name of facility etc.) transmitted from the information center 11. At S430, the control apparatus 1 displays the point indicated by the received information on latitude and longitude and/or map code together with the map by using the display device 230 of the car navigation apparatus 2. Further, the speech read-aloud section 15 of the control apparatus 1 of the vehicle reads aloud the received result (name of facility etc.) of the speech recognition, so that the received result is outputted (provided) from the speaker 5 as a speech output. In addition, from the speaker 5, the speech read-aloud section 15 outputs a speech message (guidance) asking permission to set the destination point to the point displayed on the display device 230.

At S440, the control apparatus 1 determines whether the user inputs a reply giving permission to set the destination point to the point displayed on the display device 230. When the user inputs the reply giving permission to set the destination point to the point displayed on the display device 230, the determination "YES" is made at S440, and the car navigation apparatus 2 sets the destination point to the point displayed on the display device 230, and the process proceeds to S40. Subsequent steps can be substantially the same as those of the first embodiment.

When the user inputs the reply indicating that the destination point is not to be set to the point displayed on the display device 230, the determination "NO" is made at S440, the process proceeds to S120. At S120, the speaker 5 outputs a guidance speech prompting the user to input (speak) the name of the facility. Then, the process proceeds to S140 to perform the speech recognition, and subsequent steps can be substantially the same as those of the first embodiment. Except for the above-described configuration, the fourth embodiment can have substantially the same configuration as the second embodiment.

In the fourth embodiment, the control apparatus 1 is configured as follows. When the erroneous recognition occurs multiple times in a row, and when it is determined the "same word" is spoken by the user multiple times in a row, the control apparatus 1 transmits the speech data to the external information center 11. In the information center 11, the speech recognition is again performed based on the database 27 for speech recognition, and then, the external information center 11 searches the map database 18 based on a result of the speech recognition (i.e., name or byname of a facility etc.), thereby acquiring the positional information of the facility etc. of the result of the speech recognition. For example, the information on the latitude and longitude and/or map code of the facility etc. is acquired. The control apparatus 1 receives this information on the latitude and longitude and/or map code, and the result of the speech recognition. The control apparatus 1 displays the received information and the received result with the display device 230 of the vehicle or reads aloud the received information and the received result. According to the above configuration, after the speech recognition is again performed in the information center 11 based on the database 27 for speech recognition, the control apparatus 1 can set the destination point by acquiring the position information of the facility etc. of the result of the speech recognition (the information on the latitude and longitude and/or map code). Therefore, it is possible to prevent the erroneous recognition from continuing, and it is possible to prevent the user from giving up using the speech recognition apparatus and from getting a bad impression of the speech recognition apparatus.

Fifth Embodiment

Figure 9:
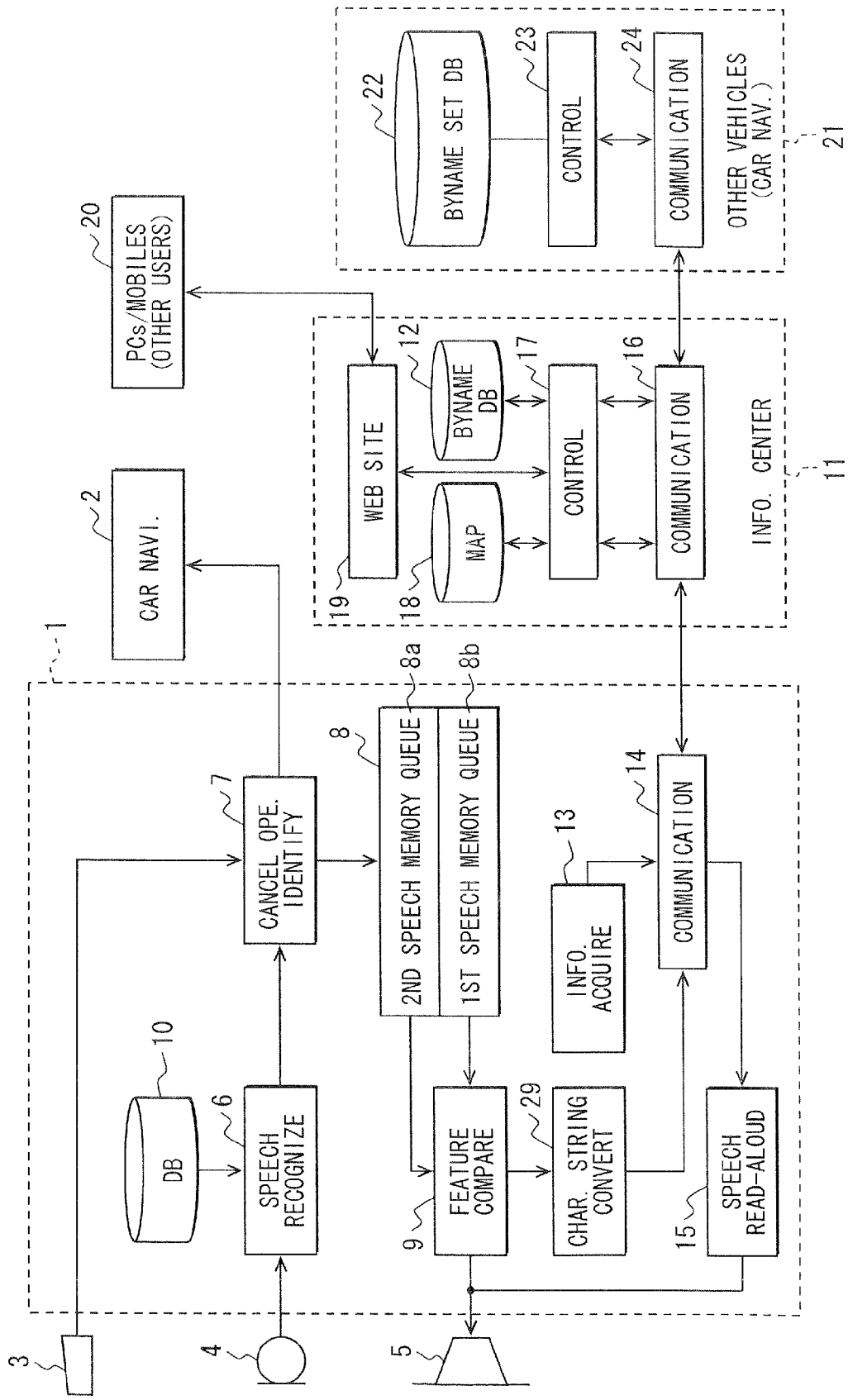
FIG. 9 is a block diagram illustrating a control operation of the speech recognition apparatus of a fifth embodiment.
Figure 10:
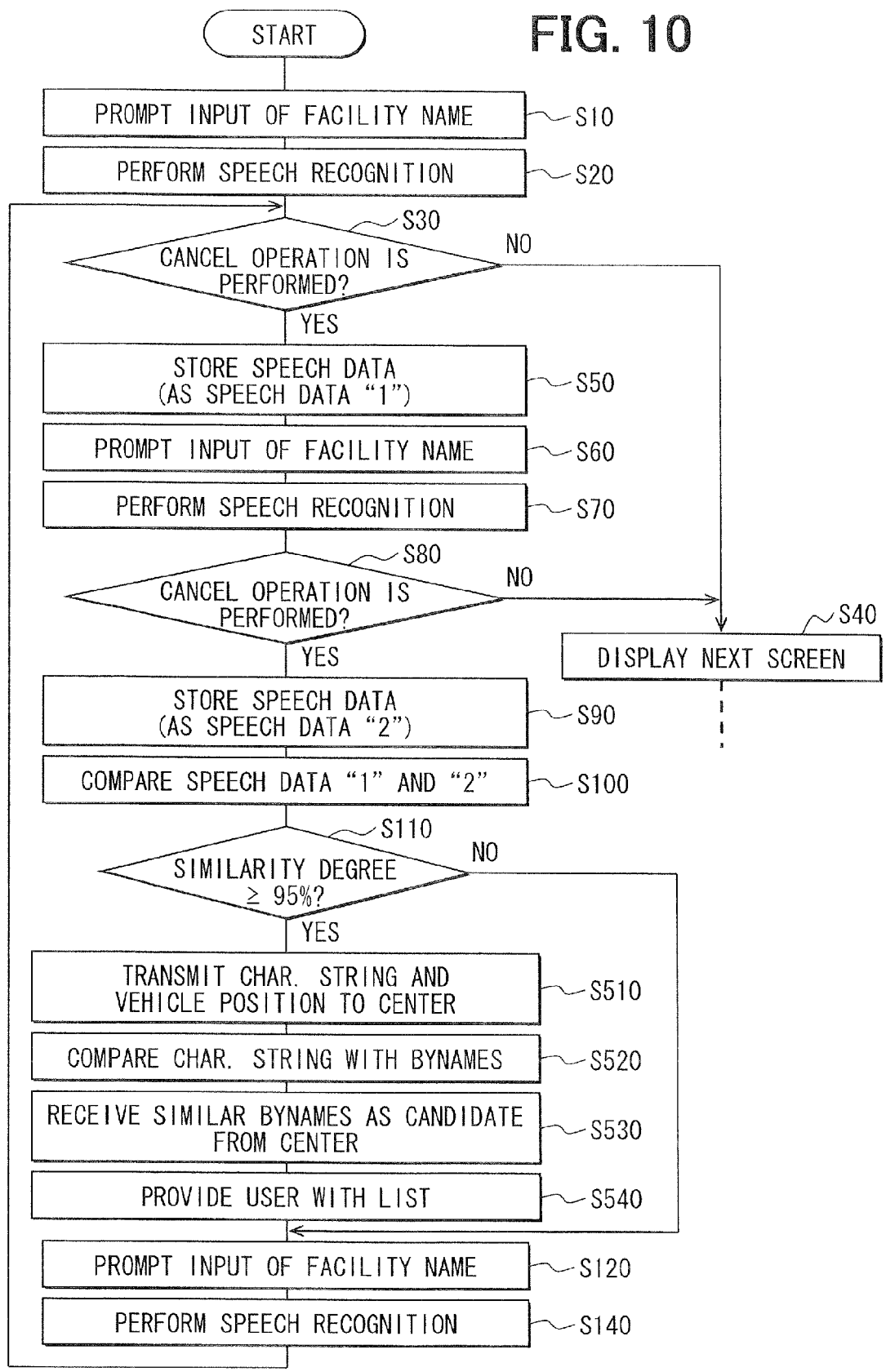
FIG. 10 is a flowchart illustrating a control operation of the speech recognition apparatus of the fifth embodiment.

FIGS. 9 and 10 illustrate a fifth embodiment. Between the fifth embodiment and the second embodiment, like references are used to refer to like parts. In the fifth embodiment, when the erroneous recognition occurs multiple times in a row, and when it is determined that the "same word" is spoken by the user multiple times in a row, the control apparatus 1 converts the speech data into a character string, transmits the character string and the information on the vehicle position to the information center 11, and causes the information center 11 to perform the following. The information center 11 searches the bynames database 12 with the received data of the character string and the received information on the present position of the vehicle, thereby acquiring a list of similar bynames of facility names of facilities existing around the present position of the vehicle by. The control apparatus 1 receives and reads aloud this list of similar bynames or displays the list with the display device 230 of the vehicle.

Specifically, as shown in FIG. 9, the control apparatus 1 of the vehicle includes a character conversion section 29. When the erroneous recognition occurs multiple times in a row and when it is determined that the "same word" is spoken by the user multiple times in a row, this character conversion section 29 converts the speech data into a character string (i.e., a character string indicating name of the facility such as byname and the like) and transmits a data of the converted character string to the information center 11 via the communication device 14. The controller 17 of the information center 11 receives the data of the character string and the information on the vehicle position from the control apparatus 1 of the vehicle, and searches the byname database 12 with the received data of the character string and the received information on the vehicle position. In this case, the controller 17 retrieves a list of bynames of facilities (i.e., a list of bynames of facility names) existing around the vehicle position. For example, the controller 17 retrieves a list of bynames of facilities located within a predetermined radius (e.g., 10 km to 20 km) from the vehicle position. Then, the controller 17 makes a comparison between the retrieved list and the received character string (e.g., the name or bynames of facility etc.), and makes a list of bynames that are similar to the character string (candidate of fuzzy-coinciding bynames). The list of bynames that are similar to the character string is referred to herein as a list of similar bynames of facility names. Then, the controller 17 transmits the list of similar bynames of facility names to the control apparatus 1 of the vehicle via the communication device 16. The speech read-aloud section 15 of the control apparatus 1 of the vehicle receives the list of similar bynames of facility names from the information center 11 via the communication device 14, and reads aloud and outputs (provides) the received list of similar bynames of facility names as a speech output from the speaker 5. A data of the received list of similar bynames of facility names is transmitted to the car navigation apparatus 2 and displayed (provided) on the display device 230. In the list of similar bynames of facility names, the similar names and the official names registered in the dictionary (and positional information of facilities) are associated with each other. Both of the similar names and the official names are displayed. In this configuration, the control apparatus 1 and the car navigation apparatus 2 can correspond to a similar name providing means or section, or an external similar name providing means or section. Alternatively, the communication device 14 and the speech read-aloud section 15 may correspond to a similar name providing means or section, or an external similar name providing means or section.

Operation of the control apparatus 1 of the fifth embodiment will be described below with reference to the flowchart of FIG. 10. Like references are used to refer to like steps between FIG. 10 of the present embodiment and FIG. 4 of the second embodiment. Since steps S10 to S110, S120 and S140 can be substantially the same as those in FIG. 4 of the second embodiment, other steps will be mainly described below.

When it is determined at S110 of FIG. 10 that the degree of similarity between the two speech data "1" and "2" is greater than the predetermined degree (e.g., 95%), it can be determined that the "same word" is spoken by the user multiple times in a row. In this case, the determination "YES" is made at S110 and the process proceeds to S510. At S510, the control apparatus 1 converts the speech data into the character string and transmits the character string and the information on the vehicle position to the information center 11.

At S520, the control apparatus 1 causes the information center 11 to perform the followings. The information center 11 receives the data of the character string and the information on the vehicle position, and searches the byname database 12 by using the character string (name of facility etc., such as byname and the like) and the vehicle position. The information center 11 retrieves the list of bynames of facilities existing around the vehicle position (e.g., existing in an area located within a predetermined radius of 10 km to 20 km from the vehicle position). The information center 11 makes a comparison between the extracted list and the received character string (name of facility etc. such as byname and the like), thereby making a list of bynames that are similar to the character string (candidates of fuzzy coinciding bynames). That is, the list of similar names of facility names is made. The information center 11 transmits the list of similar bynames of facility names to the control apparatus 1. In the transmitted list of similar bynames of facility names, the official names and the positional information (facility location information) are associated with and attached to the bynames.

At S530, the speech read-aloud section 15 of the control apparatus 1 of the vehicle receives and acquires the list of similar bynames of facility names from the information center 11. At S540, the speech read-aloud section 15 rearranges a data of the list of similar bynames of facility names in order of increasing distance from the vehicle position, and then reads aloud (provides) the data of the list of similar bynames of facility names as a speech output form the speaker 5 in order of increasing distance from the vehicle position. In addition to this speech output, the data of the list of similar bynames of facility names is transmitted to the car navigation apparatus 2 and rearranged in order of increasing from the vehicle position, and then, the data of the list is displayed with the display device 230 in order of increasing from the vehicle position.

Then, the process proceeds S120. At S120, from the speaker 5, the control apparatus 1 outputs a guidance prompting the user to input (speak) the name of the facility. Then, the process proceeds to S140 to perform the speech recognition. Subsequent steps can be substantially the same as those in the first embodiment. Except for the above-described configuration, the fifth embodiment can have substantially the same configuration as the second embodiment.

In the fifth embodiment, the control apparatus 1 is configured as follows. When the erroneous recognition occurs multiple times in a row, and when it is determined that the "same word" is spoken by the user multiple times in a row, the control apparatus 1 converts the speech data into the character string, and transmits the data of the character string and the information on the vehicle position to the external information center 11, so that the information center 11 searches the byname database 12 and acquires the list of bynames of facilities existing around the present position of the vehicle. The control apparatus 1 receives and reads aloud this list of similar bynames of facility names or displays the list on the display device 230 of the vehicle. In this configuration, when the list of similar bynames of facility names are read aloud or displayed, the user can recognize a correspondence between the similar bynames and the official names registered in the dictionary of the database 10 of the speech recognition apparatus, and thus, the user can select and speak the official name corresponding to the similar byname. In this way, since it is possible to recognize the user-spoken official name by speech recognition and acquire the official name and the positional information of the user-input-target facility, it is possible to prevent the erroneous recognition from continuing.

In the fifth embodiment, by collecting the information from other persons via the information center 11, the control apparatus 1 can acquire the list of similar bynames of facility names existing around the present position of the vehicle, and can display or read aloud the facility names having the similar names. Alternatively, the control apparatus 1 may be configured as follows. The name (similar bynames) that is in the list of similar bynames and is not registered in the dictionary may be converted into a speech data. The speech data may be automatically registered in the dictionary for speech recognition in the database 10 while being connected to the registered official name or facility location. In this configuration, when the user selects and speaks the byname, the control apparatus 1 can recognize the spoken byname by speech recognition based on the received list of similar bynames of facility names or the dictionary of the database 10, and the control apparatus 1 can acquire the official name and the positional information of the facility (facility point information).

In the above example of the fifth embodiment, the control apparatus 1 of the vehicle rearranges the data of the list of similar bynames of facility names in order of increasing distance from the vehicle. Alternatively, the information center 11 may rearrange the data of the list of similar bynames of facility names in order of increasing distance from the vehicle, and then may transmit the rearranged data of the facility name list of similar bynames to the control apparatus 1 of the vehicle.

The above control apparatus 1 may be configured as follows. When the user inputs the user-input-target facility as a first speech input by uttering the name of the user-input-target facility, the speech recognition section 6 recognizes the first speech input and refers to the dictionary of the database 10 to determine whether a facility name coinciding with the first speech input exists in the dictionary. When the speech recognition section 6 determines that the facility name coinciding with the first speech input does not exist in the dictionary, the control apparatus 1 (position information providing section) notifies the user that the facility name coinciding with the first speech input does not exist in the dictionary. Further, the control apparatus 1 stores the first speech input and prompts the user to re-input the user-input-target facility as a second speech input. When the speech recognition section 6 determines that the facility name coinciding with the second speech input does not exist in the dictionary, the feature comparison section 9 makes the comparison between a data of the first speech input and a data of the second speech input. When the feature comparison section 9 determines that the data of the first speech input substantially matches the data of the second speech input, the control apparatus 1 transmits the character string and the present poison of the vehicle to the external information center 11, and causes the external information center 11 to search the byname database 12, which is the database of facilities having bynames, by using the character string and the present poison of the vehicle to acquire the list of similar bynames of facility names existing around the vehicle. The control apparatus 1 receives the list of similar bynames of facilities existing around the vehicle, and provides the user with the received list.

While the invention has been described above with reference to various embodiments thereof, it is to be understood that the invention is not limited to the above described embodiments and constructions. The invention is intended to cover various modifications and equivalent arrangements.

Further, each or any combination of procedures, processes, steps, or means explained in the above may be achieved as a software section or portion and/or a hardware section or portion (e.g., circuit or integrated circuit), including or not including a function of a related device; furthermore, the hardware section or portion can be constructed inside of a microcomputer.

Furthermore, the software section or portion or any combinations of multiple software sections or portions may be included in a software program, which is contained in a computer-readable storage media so as to be executable by a CPU or is installed in a computer via a communications network.

What is claimed is:

1. A speech recognition apparatus comprising:
a speech recognition section in a processor, the speech recognition section
performs digital conversion to repeatedly convert a speech signal, which is inputted via a microphone from a user, into a speech data, the speech data being digitalized, and
performs speech recognition based on the speech data;
a comparison section in the processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input;
a guidance output section in the processor, the guidance output section outputs a guidance prompting the user to utter the user-input-target facility by calling the user-input-target facility by another name, when the comparison section determines that the speech data inputted the last time substantially matches the speech data inputted the time before the last time; and
a database including a dictionary in which facility names are registered,
wherein:
when the user inputs the user-input-target facility as a first speech input by uttering the name of the user-input-target facility, the speech recognition section recognizes the first speech input and refers to the dictionary of the database to determine whether a facility name coinciding with the first speech input exists in the dictionary;
when the speech recognition section determines that the facility name coinciding with the first speech input does not exist in the dictionary, the guidance output section
notifies the user that the facility name coinciding with the first speech input does not exist in the dictionary,
stores the first speech input, and
prompts the user to re-input the user-input-target facility as a second speech input;

when the speech recognition section determines that the facility name coinciding with the second speech input does not exist in the dictionary, the comparison section makes the comparison between a data of the first speech input and a data of the second speech input; and when the comparison section determines that the data of the first speech input substantially matches the data of the second speech input, the guidance output section outputs the guidance prompting the user to utter the user-input-target facility by calling the user-input-target facility by the another name.

2. A speech recognition apparatus comprising:

a speech recognition section in a processor speech recognition section
  performs digital conversion to repeatedly convert a speech signal, which is inputted via a microphone from a user, into a speech data, and
  performs speech recognition based on the speech data;

a comparison section in a processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input;

a guidance output section in a processor, the guidance output section makes a list of names of facilities existing in an area in the vicinity of a present position and displays the list with a display device when the comparison section determines that the speech data inputted the last time substantially matches the speech data inputted the time before the last time; and a database including a dictionary in which facility names are registered, wherein:

when the user inputs the user-input-target facility as a first speech input by uttering the name of the user-input-target facility, the speech recognition section recognizes the first speech input and refers to the dictionary of the database to determine whether a facility name coinciding with the first speech input exists in the dictionary;

when the speech recognition section determines that the facility name coinciding with the first speech input does not exist in the dictionary, the guidance output section notifies the user that the facility name coinciding with the first speech input does not exist in the dictionary, stores the first speech input, and
  prompts the user to re-input the user-input-target facility as a second speech input;

when the speech recognition section determines that the facility name coinciding with the second speech input does not exist in the dictionary, the comparison section makes the comparison between a data of the first speech input and a data of the second speech input; and when the comparison section determines that the data of the first speech input substantially matches the data of the second speech input, the guidance output section makes the list of names of facilities existing in the area in the vicinity of the present position and displays the list with the display device.

3. The speech recognition apparatus according to claim 2, wherein:

the list lists up the facility names registered in the dictionary of the database.

4. A speech recognition apparatus comprising:

a speech recognition section in a processor, the speech recognition section
  performs digital conversion to repeatedly convert a speech signal, which is inputted via a microphone from a user, into a speech data, and
  performs speech recognition based on the speech data;

a comparison section in the processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input; and a guidance output section in the processor, the guidance output section is configured to connect with an external server via the Internet, wherein:

when the comparison section determines that the speech data inputted the last time substantially matches the speech data inputted the time before the last time, the guidance output section
  connects to the external server via the Internet makes a search by using a feature of the speech data as a search key to retrieve content, and
  displays the retrieve content with a display device, and the speech recognition apparatus uses a speech search solution enabling a search of a word with a raw speech when the search using the feature of the speech data is performed via the Internet.

5. A speech recognition apparatus for a vehicle, wherein:

a speech recognition section in a processor, the speech recognition section
  performs digital conversion to repeatedly convert a speech signal, which is inputted via a microphone from a user, into a speech data, and
  performs speech recognition based on the speech data;

a comparison section in the processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input;

an external-byname providing section in the processor, the external-byname providing section is configured to connect with an external information center; and a second database including a dictionary in which facility names are registered, wherein:

when the comparison section determines that the speech data inputted the last time substantially matches the speech data inputted the time before the last time, the external-byname providing section
- transmits information on a present position of the vehicle to the external information center,
- causes the external information center to search a first database, which is a database of facilities having bynames, to acquire a list of bynames of facilities that exists around the present position of the vehicle,
- receives the list of bynames from the external information center, and
- displays the received list of bynames with a display device, when the user inputs the user-input-target facility as a first speech input by uttering the name of the user-input-target facility, the speech recognition section recognizes the first speech input and refers to the dictionary of the second database to determine whether a facility name coinciding with the first speech input exists in the dictionary;

when the speech recognition section determines that the facility name coinciding with the first speech input does not exist in the dictionary, the external-byname providing section
- notifies the user that the facility name coinciding with the first speech input does not exist in the dictionary,
- stores the first speech input, and
- prompts the user to re-input the user-input-target facility as a second speech input;

when the speech recognition section determines that the facility name coinciding with the second speech input does not exist in the dictionary, the comparison section makes the comparison between a data of the first speech input and a data of the second speech input; and when the comparison section determines that the data of the first speech input substantially matches the data of the second speech input, the external-byname providing section
- transmits the information on the present position of the vehicle to the external information center,
- causes the external information center to search the first database of the external information center to acquire a list of bynames of facilities existing around the present position of the vehicle,
- receives the list of bynames from the external information center, and
- displays the received list of bynames with the display device.

6. The speech recognition apparatus according to claim 5, wherein:
the external-byname providing section displays a first name set and a second name set in pairs with the display device;
the first name set is a set of names registered in the dictionary of the second database; and
the second name set is a set of bynames not registered in the dictionary of the second database.

7. The speech recognition apparatus according to claim 6, wherein:
the external-byname providing section causes the display device to display the first name set and the second name set distinguishably from each other.

8. The speech recognition apparatus according to claim 5, wherein:
the first database, which the external information center searches in acquiring the list of bynames of facilities existing around the present position of the vehicle, includes popular names and nicknames by which other users call the facilities.

9. The speech recognition apparatus according to claim 8, wherein:
the other users are local people in an area around the present position of the vehicle.

10. A speech recognition apparatus for a vehicle, wherein:
a speech recognition section in a processor, the speech recognition section
- performs digital conversion to repeatedly convert a speech signal, which is inputted via a microphone from a user, into a speech data, and
- performs speech recognition based on the speech data;

a comparison section in the processor, the comparison section makes a comparison between the speech data from the speech signal inputted a last time and the speech data from the speech signal inputted the time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input; and a database of facilities having bynames; and an internal-byname providing section in the processor, the internal-byname providing section
- acquires a list of bynames of facilities existing around a present position of the vehicle by searching the database of bynames and provides the user with the acquired list when the comparison section determines that the speech data inputted the last time substantially matches the speech data inputted the time before the last time; and the internal-byname providing section includes a speech read-aloud section that receives of bynames of facilities and outputs the list as a speech output in order of increasing distance from the present position of the vehicle.

11. A speech recognition apparatus, comprising:
a speech recognition section in a processor, the speech recognition section
- performs digital conversion to repeatedly convert a speech signal, which is inputted via a microphone from a user, into a speech data, and
- performs speech recognition based on the speech data;

a comparison section in the processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input; and a position information providing section in the processor, the position information providing section is configured to communicate with an external information center, wherein:
when the comparison section determines that the speech data inputted the last time substantially matches the speech data inputted the time before the last time, the position information providing section
transmits the speech data to the external information center,
causes the external information center to perform the speech recognition based on the transmitted speech data,
causes the external information center to acquire positional information of the user-input-target facility as a result of the speech recognition,
receives the positional information of the user-input-target facility from the external information center, and
provides the user with the acquired positional information of the user-input-target facility,
the position information of the result of the speech recognition corresponds to information on latitude and longitude and/or map code,
the position information providing section includes a speech read-aloud section, and
the speech read-aloud section provides the user with the result of the speech recognition as a speech output.

12. A speech recognition apparatus for a vehicle, comprising:
a speech recognition section in a processor, the speech recognition section
performs digital conversion to repeatedly convert a speech signal, which is inputted via a microphone from a user, into a speech data, and
performs speech recognition based on the speech data;
a comparison section in the processor, the comparison section makes a comparison between the speech data from the speech signal inputted a last time and the speech data from the speech signal inputted a time before the last time to determine whether the speech data inputted the last time substantially matches the speech data inputted the time before the last time, in response to a user's indication that the speech recognition for recognizing a name of a user-input-target facility by the speech recognition section results in erroneous recognition multiple times in a row, wherein the user-input-target facility is a specific facility that the user would like to input;
a position information providing section in the processor, the position information providing section is configured to communicate with an external information center; and
a second database including a dictionary in which facility names are registered,
wherein:
when the comparison section determines that the speech data inputted the last time substantially matches the speech data inputted the time before the last time, the position information providing section
transmits a character string, into which the speech data is converted, and a present position of the vehicle to the external information center,
causes the external information center to search a first database, which is a database of facilities having bynames, by using the character string and the present poison of the vehicle to acquire a list of similar bynames of facilities existing around the vehicle,
receives the list of similar bynames of facilities existing around the vehicle from the external information center, and
provides the user with the received list,
when the user inputs the user-input-target facility as a first speech input by uttering the name of the user-input-target facility, the speech recognition section recognizes the first speech input and refers to the dictionary of the second database to determine whether a facility name coinciding with the first speech input exists in the dictionary;
when the speech recognition section determines that the facility name coinciding with the first speech input does not exist in the dictionary, the position information providing section
notifies the user that the facility name coinciding with the first speech input does not exist in the dictionary,
stores the first speech input, and prompts the user to re-input the user-input-target facility as a second speech input;
when the speech recognition section determines that the facility name coinciding with the second speech input does not exist in the dictionary, the comparison section makes the comparison between a data of the first speech input and a data of the second speech input; and
when the comparison section determines that the data of the first speech input substantially matches the data of the second speech input, the position information providing section
transmits the character string and the present poison of the vehicle to the external information center,
causes the external information center to search the first database, which is the database of facilities having bynames, by using the character string and the present poison of the vehicle to acquire the list of similar bynames of facility names existing around the vehicle,
receives the list of similar bynames of facilities existing around the vehicle, and
provides the user with the received list.

* * * * *